(12) United States Patent
De Armas et al.

(10) Patent No.: US 10,229,391 B2
(45) Date of Patent: *Mar. 12, 2019

(54) VISUALIZATION OF RUNTIME RESOURCE POLICY ATTACHMENTS AND APPLIED POLICY DETAILS

(71) Applicant: International Business Machines Corporation, Armonk, NY (US)

(72) Inventors: Mario E. De Armas, Wellington, FL (US); Christopher M. Ketchuck, Durham, NC (US); Thomas L. Roach, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 411 days.

This patent is subject to a terminal disclaimer.

(21) Appl. No.: 15/196,729

(22) Filed: Jun. 29, 2016

(65) Prior Publication Data

US 2016/0307126 A1    Oct. 20, 2016

Related U.S. Application Data

(63) Continuation of application No. 13/765,178, filed on Feb. 12, 2013, now Pat. No. 9,430,116.

(51) Int. Cl.
*G06F 3/048* (2013.01)
*G06Q 10/10* (2012.01)
(Continued)

(52) U.S. Cl.
CPC ............. *G06Q 10/10* (2013.01); *G06F 3/048* (2013.01); *G06F 3/0482* (2013.01);
(Continued)

(58) Field of Classification Search
CPC ...................................................... G06F 3/048
(Continued)

(56) References Cited

U.S. PATENT DOCUMENTS 6,158,010 A * 12/2000 Moriconi ............. G06F 21/552
                                                    709/223
6,437,812 B1 * 8/2002 Giles .................... G06F 3/0481
                                                    715/853

(Continued)

OTHER PUBLICATIONS

United States Patent and Trademark Office, Notice of Allowance for U.S. Appl. No. 14/224,508, dated Aug. 24, 2016, pp. 1-21, Alexandria, VA, USA.

(Continued)

*Primary Examiner* — Reza Nabi
(74) *Attorney, Agent, or Firm* — Lee Law, PLLC; Christopher B. Lee

(57) ABSTRACT

An effective applied policy configuration associated with a selected policy resource is created responsive to a selection of a policy resource within a service policy visualization interface based upon results of programmatic introspection of the selected policy resource. The effective applied policy configuration includes correlated and combined effects of service policies identified by the programmatic introspection as attached to the selected policy resource within a resource hierarchy associated with the selected policy resource. The effective applied policy configuration associated with the selected policy resource, including the correlated and combined effects of the attached service policies, is displayed within the service policy visualization interface.

13 Claims, 9 Drawing Sheets

(51) Int. Cl.
*G06F 3/0482* (2013.01)
*G06F 3/0484* (2013.01)
*G06Q 10/06* (2012.01)
*G06Q 30/00* (2012.01)
*H04L 29/08* (2006.01)

(52) U.S. Cl.
CPC ....... *G06F 3/04842* (2013.01); *G06Q 10/067* (2013.01); *G06Q 30/018* (2013.01); *H04L 67/02* (2013.01)

(58) Field of Classification Search
USPC .......................................................... 715/739
See application file for complete search history.

(56) References Cited

U.S. PATENT DOCUMENTS

| | | | | | |
|---|---|---|---|---|---|
| 7,251,822 | B2* | 7/2007 | Agarwal | ............ | G06F 21/6218 707/999.001 |
| 7,310,684 | B2* | 12/2007 | Patrick | ................... | G06Q 10/00 709/206 |
| 7,647,621 | B2* | 1/2010 | Russell | ................. | G06F 21/105 709/220 |
| 7,734,784 | B1* | 6/2010 | Araujo | .................... | H04W 4/50 709/226 |
| 7,752,574 | B2* | 7/2010 | Dere | ................. | G06F 17/30994 715/713 |
| 8,015,204 | B2* | 9/2011 | Kaler | ................. | G06F 21/6218 707/783 |
| 8,099,758 | B2* | 1/2012 | Schaefer | ........... | G06F 17/30082 726/1 |
| 8,126,856 | B2* | 2/2012 | Sabsevitz | .......... | G06F 17/30067 707/694 |
| 2002/0151293 | A1* | 10/2002 | Tysor | ................. | H04L 12/2854 455/406 |
| 2004/0240447 | A1* | 12/2004 | Dorbolo | ............. | H04L 12/2856 370/392 |
| 2005/0198351 | A1* | 9/2005 | Nog | ...................... | H04L 45/306 709/232 |
| 2006/0206931 | A1* | 9/2006 | Dillaway | ............ | G06F 21/6218 726/9 |
| 2007/0006278 | A1* | 1/2007 | Ioan Avram | ........ | G06F 21/6218 726/1 |
| 2007/0156919 | A1* | 7/2007 | Potti | ....................... | G06F 8/656 709/238 |
| 2007/0192500 | A1* | 8/2007 | Lum | ................. | H04L 29/12028 709/230 |
| 2008/0046335 | A1* | 2/2008 | Zhou | ...................... | G06Q 10/00 705/26.8 |
| 2008/0113646 | A1* | 5/2008 | Cereceres | ............. | H04M 15/00 455/405 |
| 2009/0132543 | A1* | 5/2009 | Chatley | ................. | G06F 3/0613 |
| 2009/0138940 | A1* | 5/2009 | Liu | ......................... | G06F 21/62 726/1 |
| 2010/0058434 | A1* | 3/2010 | Chusing | ................ | G06F 21/604 726/1 |
| 2010/0131629 | A1* | 5/2010 | Waltman | ............... | G06F 9/5055 709/222 |
| 2010/0205293 | A1* | 8/2010 | Hu | ........................ | G06Q 10/00 709/224 |
| 2010/0319004 | A1* | 12/2010 | Hudson | ................. | G06F 9/5072 719/313 |
| 2011/0047451 | A1* | 2/2011 | Jardine-Skinner | ..... | G06Q 10/06 715/234 |
| 2011/0137776 | A1* | 6/2011 | Goad | ................... | G06Q 20/102 705/34 |
| 2011/0209194 | A1* | 8/2011 | Kennedy | ................. | G06F 21/55 726/1 |
| 2011/0225281 | A1* | 9/2011 | Riley | ...................... | H04L 12/14 709/223 |
| 2011/0276875 | A1* | 11/2011 | McCabe | ................. | G06Q 10/10 715/255 |
| 2011/0282907 | A1* | 11/2011 | Ramsey | ............. | G06F 21/6218 707/783 |
| 2012/0066620 | A1* | 3/2012 | Teng | ....................... | G06F 9/451 715/762 |
| 2012/0089727 | A1* | 4/2012 | Raleigh | ................... | H04L 12/14 709/224 |
| 2012/0101952 | A1* | 4/2012 | Raleigh | ................ | G06Q 30/016 705/304 |
| 2012/0158931 | A1* | 6/2012 | Ohlnnan | ................. | G06Q 10/101 709/223 |
| 2012/0257547 | A1* | 10/2012 | Oren | ....................... | H04W 4/20 370/259 |
| 2013/0340029 | A1* | 12/2013 | De Armas | ............... | H04L 63/20 726/1 |
| 2014/0229594 | A1* | 8/2014 | Burke | ................. | H04L 41/0893 709/223 |
| 2014/0229595 | A1* | 8/2014 | Burke | ................. | H04L 41/0893 709/223 |
| 2014/0229596 | A1* | 8/2014 | Burke | ................. | H04L 63/20 709/223 |
| 2014/0229844 | A1* | 8/2014 | De Armas | ............... | G06F 3/048 715/739 |
| 2014/0230006 | A1* | 8/2014 | Burke | ..................... | H04L 63/20 726/1 |
| 2014/0248852 | A1* | 9/2014 | Raleigh | ............... | H04M 15/723 455/407 |
| 2014/0279129 | A1* | 9/2014 | Johnson | ............. | G06Q 30/0601 705/26.1 |

OTHER PUBLICATIONS

United States Patent and Trademark Office, Office Action for U.S. Appl. No. 13/765,178, dated Mar. 3, 2015, pp. 1-15, Alexandria, VA, USA.

United States Patent and Trademark Office, Office Action for U.S. Appl. No. 13/765,178, dated Jun. 26, 2015, pp. 1-13, Alexandria, VA, USA.

United States Patent and Trademark Office, Notice of Allowance for U.S. Appl. No. 13/765,178, dated May 20, 2016, pp. 1-12, Alexandria, VA, USA.

United States Patent and Trademark Office, Office Action for U.S. Appl. No. 14/224,508, dated Apr. 21, 2016, pp. 1-22, Alexandria, VA, USA.

\* cited by examiner

- PROXY: ROUTE-POLICY-TEST (11 TOTAL ATTACHMENTS)
  - ⊞ WSDL: PRIMENUMBERS.WSDL (5 TOTAL ATTACHMENTS)
  - ⊟ WSDL: SHAKESPEARE.WSDL (5 TOTAL ATTACHMENTS)
    - ⊞ SERVICE: {LOCAL://XMIME.COM/WEBSERVICES} SHAKESPEARE (4 OF 5 TOTAL ATTACHMENTS)
  - ⊟ WSDL: NUMBERCONVERSION.WSDL (1 TOTAL ATTACHMENT)
    - ⊞ SERVICE: {LOCAL://WEBSERVICESERVER/} NUMBERCONVERSION (1 OF 1 TOTAL ATTACHMENT)
  - ⊟ WSDL: GLOBALWEATHER-EMBEDDED-POLICIES.WSDL (0 TOTAL ATTACHMENTS)
    - ⊞ SERVICE: {LOCAL://WEATHER} GLOBALWEATHER (0 OF 0 TOTAL ATTACHMENT)

FIG. 5

| CONTENT FILTER NAME | CONTENT FILTER VALUE | CONTENT FILTER NAME | CONTENT FILTER VALUE | VIEW |
|---|---|---|---|---|
| ANY | | | | 1 |
| MEMBER LEVEL | GOLD | | | 3 |
| BUSINESS | EXAMPLE CORP | | | 4 |
| MEMBER LEVEL | GOLD | BUSINESS | EXAMPLE CORP | 1 |

600
602 — CONTENT FILTER NAME
604 — CONTENT FILTER VALUE
606 — CONTENT FILTER NAME
608 — CONTENT FILTER VALUE
610 — VIEW
612 — ANY
614 — MEMBER LEVEL
616 — BUSINESS
618 — MEMBER LEVEL

FIG. 6

VISUALIZATION OF RUNTIME RESOURCE POLICY ATTACHMENTS AND APPLIED POLICY DETAILS

BACKGROUND

The present invention relates to service level agreement (SLA) policy enforcement. More particularly, the present invention relates to visualization of runtime resource policy attachments and applied policy details.

Within an information technology (IT) environment, service providers may specify business policies based upon the service provider resources being used by a particular consumer or transaction. The specified business policies may be applied these resources. For example, service level agreements (SLAs) are contracts for services formed between consumers and service providers. A consumer may enter into a service level agreement with a service provider to send and/or receive an agreed number of messages (e.g., text messages) per month for a contracted/set fee. The SLA may further specify that if the consumer exceeds the agreed number of messages per month associated with the contracted/set fee, an additional per message fee will be charged for each additional message. As such, the SLA represents such a business policy.

SUMMARY

A method includes: creating, responsive to a selection of a policy resource within a service policy visualization interface based upon results of programmatic introspection of the selected policy resource, an effective applied policy configuration associated with the selected policy resource comprising correlated and combined effects of service policies identified by the programmatic introspection as attached to the selected policy resource within a resource hierarchy associated with the selected policy resource; and displaying the effective applied policy configuration associated with the selected policy resource comprising the correlated and combined effects of the attached service policies within the service policy visualization interface.

A system includes a display and a processor programmed to: create, responsive to a selection of a policy resource within a service policy visualization interface based upon results of programmatic introspection of the selected policy resource, an effective applied policy configuration associated with the selected policy resource comprising correlated and combined effects of service policies identified by the programmatic introspection as attached to the selected policy resource within a resource hierarchy associated with the selected policy resource; and display, via the display, the effective applied policy configuration associated with the selected policy resource comprising the correlated and combined effects of the attached service policies within the service policy visualization interface.

A computer program product includes a computer readable storage medium having computer readable program code embodied therewith, where the computer readable program code when executed on a computer causes the computer to: create, responsive to a selection of a policy resource within a service policy visualization interface based upon results of programmatic introspection of the selected policy resource, an effective applied policy configuration associated with the selected policy resource comprising correlated and combined effects of service policies identified by the programmatic introspection as attached to the selected policy resource within a resource hierarchy associated with the selected policy resource; and display the effective applied policy configuration associated with the selected policy resource comprising the correlated and combined effects of the attached service policies within the service policy visualization interface.

BRIEF DESCRIPTION OF THE DRAWINGS

FIG. 5 is a diagram of an example of an implementation of a graphical user interface (GUI) for visualization of runtime resource policy attachments and applied policy details that allows visualization of a resource hierarchy according to an embodiment of the present subject matter;

FIG. 6 is a diagram of an example of an implementation of a graphical user interface (GUI) for visualization of runtime resource policy attachments and applied policy details for visualization of sets of content filters that may be evaluated to determine what policies that apply to a given message are processed by a resource according to an embodiment of the present subject matter;

DETAILED DESCRIPTION

Figure 1:
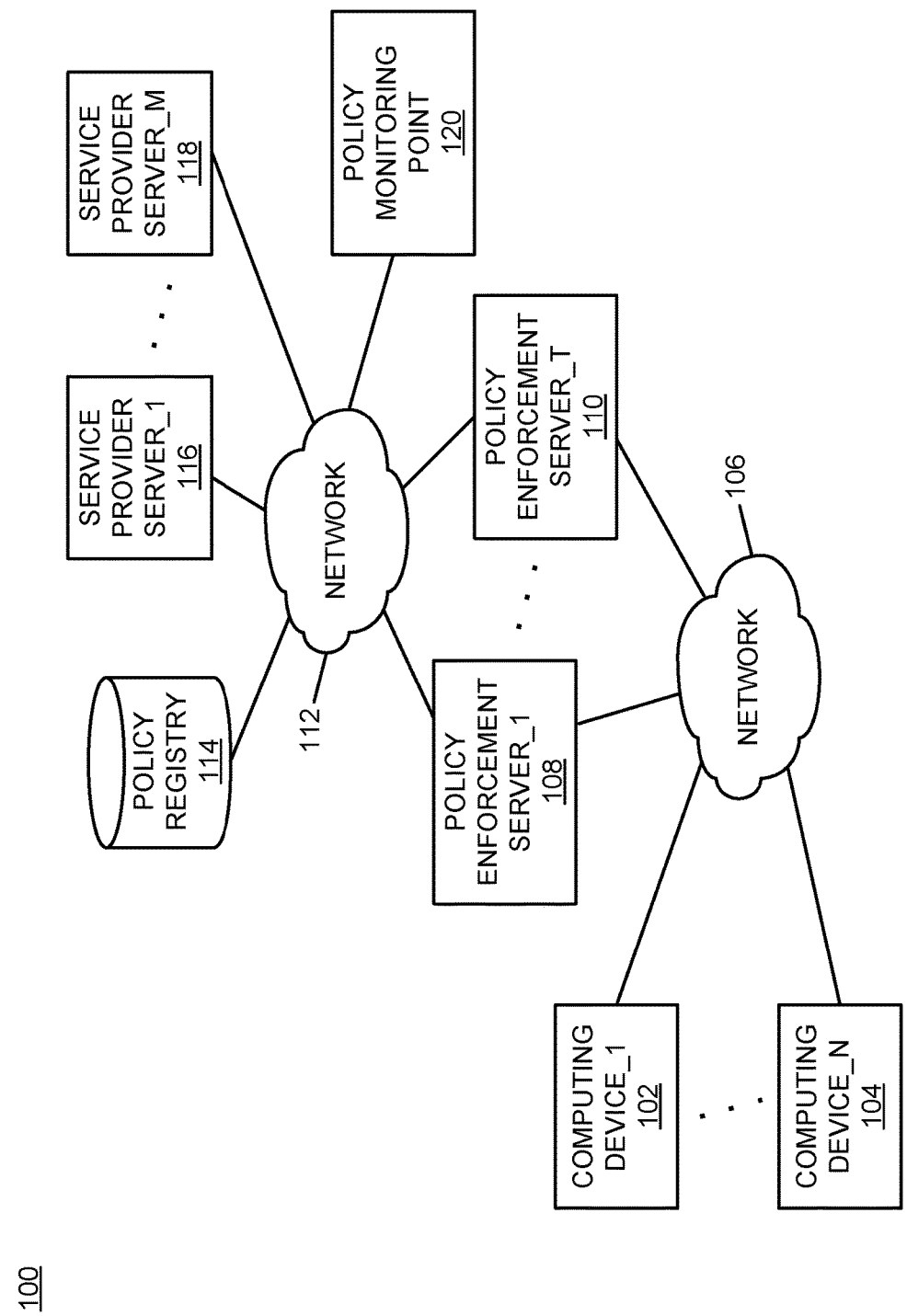
FIG. 1 is a block diagram of an example of an implementation of a system for visualization of runtime resource policy attachments and applied policy details according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides visualization of runtime resource policy attachments and applied policy details. The visualization of runtime resource policy attachments and applied policy details described herein may be performed, for example, by policy monitoring points (PMPs), or other devices as appropriate for a given implementation. The present technology provides three visualization steps that may be utilized to enhance policy evaluation and analysis. A first visualization step allows a policy administrator to identify a web service resource of interest. A second visualization step allows the policy administrator to identify a set of message content filters that describe a specific scenario associated with the identified web service resource of interest. A third visualization step allows the policy administrator to view the detail of conditions that are evaluated by policies for that identified set of message content filters and to view actions that are taken depending on outcomes of those conditions. As such, the present technology may be utilized to identify, within a visual environment, runtime resource policy attachments and applied policy details across multiple hierarchical arrangements, or other nested or abstracted arrangements.

As described in detail below, the policy visualization technology described herein is concerned with three interrelated aspects of the policy and presents these interrelated aspects to the user (e.g., policy administrator) in three steps, each of which also provides visualized output to assist the user with interpretation of policy applications within a runtime system. The first step identifies what policies are attached and inherited at each resource. The second step determines what effective policies are created from the various disparate policy attachment files and message content filters. The third step determines what runtime conditions, if any, are evaluated, and what actions, if any, are performed for a particular set of content filters. It is the combination of these three aspects of the visualization that together allow the user to fully visualize the complete policy applied to messages for a given web service, and to accurately understand and predict system behavior for any given set of resources, messages, and runtime conditions.

For purposes of the present description, the term "effective policy" may be considered a consolidated/compacted representation of policies applied from all layers of a policy hierarchy within the resource hierarchy. The effective policy identifies all conditions upon which actions may be taken upon messages by a given resource. An effective policy may be created for each resource based upon locally-defined and inherited policies. As such, the effective policy for a resource may be identified as described herein and utilized for analysis of messaging actions performed by resources during policy enforcement.

In order to completely visualize the policy behavior applied to a resource, introspection of the respective policy attachments may be performed to identify the respective runtime resource policy attachments. Introspection may be utilized, for example, to determine what policy or policies are attached to each level in the hierarchy of resources, to determine under what conditions the policy or policies are applied to a given message, and to determine what runtime conditions are set/configured within the policy and what conditional actions are configured to be performed in response to the message. Introspection provides a programmatic approach to determining a comprehensive set of associations between the respective runtime resource policy attachments and resources.

The present technology may be utilized to present a policy administrator with a view of the specific policies applied to a given resource or collection of resources in a scenario where many policies and objects may be defined. In addition, policies may be attached such that they only apply to specific consumers of these resources or particular messages. Additionally, a policy may be attached, but may describe different actions to take depending on further conditions evaluated at runtime.

To provide one possible example use case, the policy administrator may use the present technology to troubleshoot a problem by identifying a particular resource for which the attached behavior is not implemented as expected. The present technology may further allow the policy administrator to view what system behavior is defined for the particular resource, and to view/determine under what circumstances that behavior will change if the definition is changed. For example, a policy administrator may see that the behavior defined for that resource is correct, but that it is inheriting additional policy conditions from a resource higher in the nested hierarchy and may determine that the inherited additional policy conditions are impacting access to or other aspects of the resource. As another example, the policy administrator may determine that the correct policies are being attached, but that a syntactic or semantic error within one of the policy files is causing incorrect behavior, which would allow the policy administrator to quickly repair the policy attachment file to alleviate the error.

For purposes of the examples described herein, resources may be considered to be arranged in a hierarchical manner, such that policies applied to a top level resource automatically apply to resources beneath that resource in the respective hierarchy. The present examples further represent an example web service hierarchy with a service, port (or binding), operations, and message parts/resources within the web service hierarchy. The present description utilizes visualization of policy attachments and details for a web service for purposes of example to show example policies that may be applied to a given message sent to that web service, to show what conditions may be evaluated, and to show what actions may be taken depending upon the evaluation of the conditions. However, while a web service is used for purposes of example herein, it should be noted that the present subject matter may be implemented to process other systems and hierarchies. For example, the present technology may be used for visualization of runtime resource policy attachments and applied policy details for a system oriented architecture (SOA) hierarchy, such as a representational state transfer (REST) resource with a service, a uniform resource locator (URL), and the associated GET, POST, and DELETE processing performed within such systems. As such, the present technology may be applied to any such SOA resource hierarchy.

Policies may further be refined using message content filters such that they apply only to specific consumers of these web service resources. For example, consumers in a "gold" service level group may be given access to particular resources, and access to the respective resources may be blocked for other users. Additionally, the policies themselves may define further conditions such that, even when a policy or set of policies is applied to a particular consumer of a resource, evaluation of run-time conditions, such as network traffic for example, may further refine behavior.

In order to provide a foundation for the description of the visualization technology described below, it should be understood that various separate elements come together to determine the system behavior that a policy creates. For example, when a message comes in to a given resource, the position of that resource in the hierarchy determines what policies are considered. Message processing may further depend upon message content filters defined in the policy and the details of the message itself, and these aspects may further impact what policies are applied. Each policy may then specify a set of conditions and actions to take based on those conditions. As such, the policy as well as the operating conditions of the appliance (e.g., policy enforcement point (PEP)) at runtime may further impact the actions that are taken with respect to the message. To further clarify the runtime operating conditions and to provide to the policy administrator a transparent view of the actions that are configured to be taken for a given message, the present technology visually communicates three separate aspects to the policy administrator: the resource hierarchy associated with the message, the applicable message content filters, and the applicable runtime conditions and actions to be taken based upon the message.

The present technology leverages automated policy transformation and runtime enforcement that allows policies within a policy domain (e.g., service provider policy domain, etc.) to be associated with any runtime object (e.g., objects representing specific consumers, organizations, service resources, etc.) that needs to be controlled or regulated by that policy. Those policies may be enforced against the runtime object(s) at policy enforcement points (PEPs) that operate to provide proxy service offerings including policy enforcement to manage the respective services. Examples of runtime objects against which policies may be enforced include transactions, web requests, database requests, representational state transfer (REST) services, and web applications. The control or regulation of the runtime object by policy may be further determined based upon the content of that object at runtime, such as user credentials. Policies may be attached at an object level for an object, thereby enhancing the specificity of policy enforcement based upon the granularity of the respective objects (e.g., at the level of specific consumers, organizations, service resources, etc.) and based upon the content of those objects at runtime.

It should be noted that conception of the present subject matter resulted from recognition of certain limitations associated with evaluation of runtime policy attachments and applied policy details. For example, it was observed that, with respect to policy enforcement evaluation and analysis, a combination of factors, such as inheritance of policies, multiple policies, multiple types of policies, message specific policies, and policy actions based on run-time conditions, creates a complex set of behaviors associated with policy enforcement. Further, it was determined that because of the complex interrelationships of the factors described above, it is difficult for users to track or determine what actions will be taken if a given consumer tries to access a specific resource (e.g., policies applied to nested resources). As a result, it was determined that these factors lead to unexpected behavior or behavior that is difficult to predict within the system and that causes increased overhead for resultant analysis to identify a root cause of such behavior, to alter such behavior, or to correct anomalies resulting from such behavior. It was further observed that it is difficult to troubleshoot issues when the error may be due to inheritance, message content filters, incorrect syntax, or semantics within one of many different policy attachment files. Accordingly, it was determined that a solution that encompasses all of these separate aspects of a service policy and that brings these aspects together to provide a clearer, more transparent model with which the user may interact would improve policy development, deployment, troubleshooting, updates, and other policy life cycle issues. It was further determined that a programmatic visualization approach may improve efficiency in managing these policy life cycle issues. As such, in view of the observations and determinations described above, the present subject matter improves policy administration and enforcement by providing technology for visualization of runtime resource policy attachments and applied policy details, as described above and in more detail below.

Several additional definitions may be utilized within the following description, and some are repeated and further defined below. The term "service policy" or "policy" as utilized herein represents any mediation enforcement provision, routing provision, security provision, or any other custom policy/provision that is written to a specification that a policy enforcement system may implement. As such, a service policy may be implemented as a web service (e.g., web services description language (WSDL)), as a representational state transfer (REST) implementation or service, as a web application (e.g., plain old XML (PDX)) implementation, as a database request, or otherwise as appropriate for the given implementation.

Regarding service policies, a service level agreement (SLA) is a service policy that represents an agreement (e.g., a contract for services) between a service provider and a consumer where a level of service is formally defined and agreed between the parties to the SLA. The SLA records a common understanding about services, priorities, responsibilities, guarantees, warranties, and any other particulars of the agreement. Examples of SLAs include business services such as a web service, a REST service, and a web application. The SLA may specify, for example, the levels of availability, serviceability, performance, operation, or other attributes of the service to be provided by the service provider to the consumer. As a further example, an SLA may represent a processing agreement such as a transaction rate, a processor utilization level, a disk utilization level, and a memory utilization level for the business service.

A service level definition (SLD) represents a service policy that protects the service provider infrastructure access and utilization constraints, such as for example from accesses by non-contracting entities for which an SLA has not been established, or to limit a maximum resource utilization to prevent service degradation (e.g., maximum number of messages per minute). An SLD, when attached to a policy subject, is enforced by a policy enforcement point (PEP). A "policy subject" represents an entity with which a policy (e.g., an SLA or SLD) may be associated, such as for example, with an endpoint of a transaction, a message, a resource, an operation, or other entity.

A policy administration point (PAP) represents a location (e.g., repository, registry, etc.) where policies such as SLAs and SLDs may be created, stored, accessed, and modified. A WebSphere® service registry and repository (WSRR) represents one possible example of a PAP. A policy enforcement point (PEP) represents an intermediary system that operates to enforce defined policies. The PEP provides proxy service offerings including policy enforcement. A "policy framework" represents the infrastructure used to convert supported policy vocabularies into processing actions and processing rules.

A policy may be specified as an SLA between a service provider and a consumer. Each consumer may have its own selected service options. As such, for purposes of the present example, it is assumed that two consumers have selected different service plans for a particular service. Within this example, one consumer has selected a "default" service level defined within the service provider domain for this particular service offering at a level of one hundred (100) allowed requests per hour. Similarly, another consumer has selected a higher-tier service level, identified within the present example as a "gold" service level group, with a service offering of five hundred (500) allowed requests per hour. As such, enforcement of this SLA by a PEP would involve identification of the respective consumers, correlation of the respective consumers with their selected service plans/levels, and monitoring of request rates (e.g., message rates, transaction rates, etc.) for each consumer based upon their respective selected plans. If a threshold number of requests per hour associated with a selected plan were reached, the PEP would then invoke processing to identify any additional service requests as overages relative to the plan or prevent the service requests, as appropriate for a given implementation. Similarly, if a consumer issues a request that is authorized based upon the selected service plan, the PEP is responsible for ensuring that the request is satisfied for the consumer by the service provider. Again, policies may be attached hierarchically within a policy enforcement domain, such as at an operation level, at a port level, and at a service level.

The present technology enhances policy enforcement functionality by providing for visualization of runtime resource policy attachments and applied policy details. The visualization of runtime resource policy attachments and applied policy details may also enhance policy monitoring, evaluation, and modification. The policy enforcement rules and actions are dynamically implemented and enforced on a transactional basis during runtime as transactions associated with the defined policies occur (e.g., as messages are received), and as such, monitoring and correlation may also be performed during runtime as transactions occur.

Example transformations include transformation of a defined service policy into one or more processing actions in a normalized and interchangeable format. The normalized and interchangeable format may include, for example, a language such as extensible markup language (XML), XML stylesheet language for transformations (XSLT), object-oriented languages such as Java™ and C++ programming languages, relational database management (RDBM) languages such as structured query language (SQL), and scripting languages/implementations such as PHP: Hypertext Preprocessor (PHP) and Perl.

It should be noted that the PEP processing technology described herein operates as a proxy for both the service providers and the consumers to enforce the various provisions of defined SLAs and SLDs. As such, the PEP represents a proxy component/entity for both the service provider(s) and for the consumer(s). Within this proxy context for policy enforcement, the PEP operates to protect the interests of the service providers to ensure that no unauthorized consumers access the respective services provided by the service providers and to ensure that consumers that are authorized do not exceed the defined SLDs associated with the services and service providers. Similarly, the PEP operates to protect the interests of consumers and service providers to ensure that the SLA(s) for which the consumers and service providers have contracted are upheld/enforced. To fulfill this dual-proxy role, the PEP operates as a proxy intermediary for both of the respective entities to analyze messages communicated between the respective entities and to enforce policy enforcement rules that are defined in association with the PEP based upon policies associated with the respective services and agreements.

A policy framework, as described in more detail below, consumes policies for enforcement by a PEP and evaluates policy enforcement activities configured based upon the particular resource (and potentially contents of the resources). To enforce the respective policies, the policy framework generates policy enforcement rules that include processing actions.

The technology for visualization of runtime resource policy attachments and applied policy details described herein may be performed in real time to allow prompt analysis of policies attached to resources and the hierarchical relationship of the attached policies. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for visualization of runtime resource policy attachments and applied policy details. A computing device_1 102 through a computing device_N 104 represent consumer client devices that utilize services specified by SLAs. The computing device_1 102 through the computing device_N 104 may communicate with one another and with other devices via a network 106. A policy enforcement server_1 108 through a policy enforcement server_T 110 represent policy enforcement points (PEPs), as described above. The policy enforcement server_1 108 through the policy enforcement server_T 110 communicate and interconnect via a network 112 with a policy registry 114 that stores policies (e.g., SLDs and SLAs) generated by one or more of a service provider server_1 116 through a service provider server_M 118. It should be noted that the network 106 and the network 112 are illustrated as separate networks for ease of description, and that any arrangement of interconnection may be utilized as appropriate for a given implementation.

The service provider server_1 116 through the service provider server_M 118 represent service capable devices (e.g., messaging devices for text messages, etc.). The service provider server_1 116 through the service provider server_M 118 also represent administrative devices that may be utilized by service provider administrators for policy creation, such as creation of SLDs and SLAs.

Policies implemented by service provider administrators via devices, such as the service provider server_1 116 through the service provider server_M 118, may be stored within the policy registry 114 for enforcement by PEPs, such as the policy enforcement server_1 108 through the policy enforcement server_T 110. The policy enforcement server_1 108 through the policy enforcement server_T 110 each implement a policy framework as described in more detail below for transformation and enforcement of defined service policies stored in the policy registry 114 into policy enforcement rules that include processing rules and processing actions that are to be enforced during runtime against objects. The objects may be of varying granularity (e.g., at the level of specific consumers, organizations, service resources, etc., as described above) based upon the particular scope and configuration of the respective policies to be enforced for the respective service providers and consumers.

A PEP may be implemented via each of the policy enforcement server_1 108 through the policy enforcement server_T 110. The PEP has the role of enforcing policies defined outside or within the PEP. The PEPs operate as gateways that provide virtual services that proxy policy enforcement operations for the real backend services. The PEPs protect and optimize transactions flowing through the respective network(s) on behalf of the backend services. As such, the policy enforcement server_1 108 through the policy enforcement server_T 110 each represent proxy gateways that provide proxy services for the service providers represented by the service provider server_1 116 through the service provider server_M 118 and for consumers represented by the computing device_1 102 through the computing device_N 104.

It should be noted that there may be a many-to-one relationship of PEPs to service providers. Each PEP may create its own policy enforcement rules based upon policies to be enforced for a given service provider. By use of the present technology, the policy enforcement rule creation from defined policies may be consistently repeated across the set of PEPs that are designated to enforce the respective policies.

A policy monitoring point (PMP) 120 provides policy visualization capabilities for analysis of runtime resource policy attachments and applied policy details within the system 100. The PMP 120 identifies, in response to user selections of, for example message content filters, policy enforcement artifacts (e.g., processing rules and processing actions) that are applied to the respective messages/resources within a hierarchical policy enforcement arrangement where policy attachments may be inherited from other layers within the policy hierarchy. The PMP 120 may evaluate transaction details from one or more PEPs implemented via the policy enforcement server_1 108 through the policy enforcement server_T 110. It should be noted that while the PMP 120 is illustrated as a separate component for ease of description purposes, it may be implemented via one of the policy enforcement server_1 108 through the policy enforcement server_T 110 or the service provider server_1 116 through the service provider server_M 118 without departure from the scope of the present technology.

As will be described in more detail below in association with FIG. 2 through FIG. 9, the PMP 120 provides technology for automated visualization of runtime resource policy attachments and applied policy details. The automated visualization of runtime resource policy attachments and applied policy details is based upon runtime analysis of policy attachments and applied policy details (e.g., policy enforcement rules and actions) enforced during runtime to fulfill the respective SLDs and SLAs established for messaging management within the system 100. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a service provider messaging server, a web server, application server, or other data server device, or any other device capable of processing information as described above and in more detail below.

The network 106 and the network 112 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
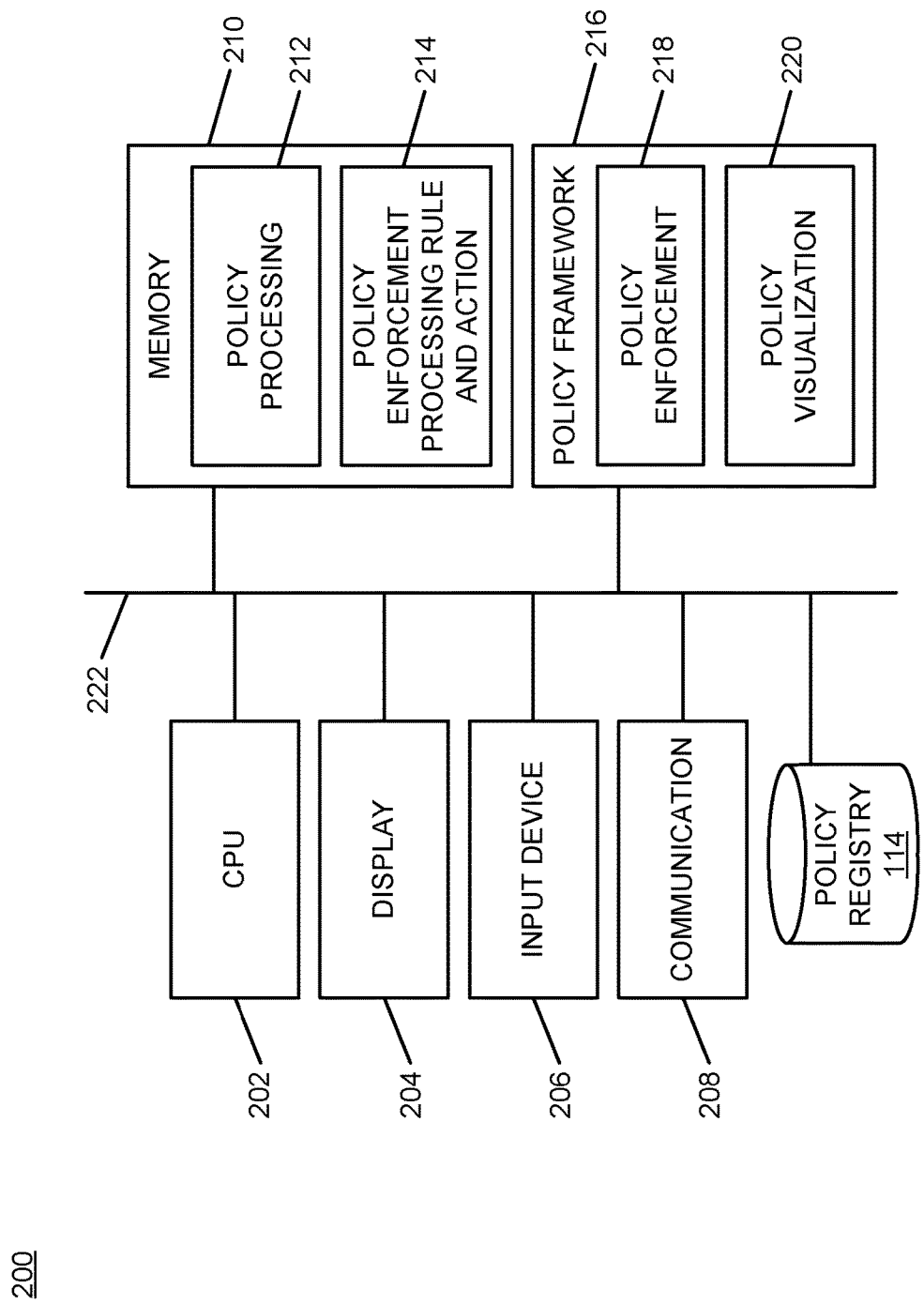
FIG. 2 is a block diagram of an example of an implementation of a core processing module capable of visualization of runtime resource policy attachments and applied policy details according to an embodiment of the present subject matter.

FIG. 2 is a block diagram of an example of an implementation of a core processing module 200 capable of visualization of runtime resource policy attachments and applied policy details. The core processing module 200 may be associated with the PMP 120 to implement the visualization of runtime resource policy attachments and applied policy details. It should, however, be noted that components of the core processing module 200 may additionally or alternatively be associated with the computing device_1 102 through the computing device_N 104, with the policy enforcement server_1 108 through the policy enforcement server_T 110, or with the service provider server_1 116 through the service provider server_M 118, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing for visualization of runtime resource policy attachments and applied policy details in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a policy processing storage area 212 that provides memory space for analysis of registry policies (e.g., SLAs and SLDs) in association with the core processing module 200 when implemented, for example, in association with one or more of the PMP 120. The memory 210 also includes a policy enforcement processing rule and action storage area 214 that provides storage space for created policy enforcement rules and associated runtime processing actions. As described above, the created policy enforcement rules and associated runtime processing actions may be utilized for runtime enforcement of defined policies (e.g., SLAs and SLDs) in association with the core processing module 200 when implemented, for example, in association with one or more of the policy enforcement server_1 108 through the policy enforcement server_T 110.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A policy framework module 216 is also illustrated. The policy framework module 216 provides processing capabilities for the core processing module 200, as described above and in more detail below. The policy framework module 216 implements the technology for visualization of runtime resource policy attachments and applied policy details of the core processing module 200.

The policy framework module 216 includes a policy enforcement module 218 that implements the policy enforcement, such as via one of the policy enforcement server_1 108 through the policy enforcement server_T 110. The policy framework module 216 also includes a policy visualization module 220 that implements the visualization of runtime resource policy attachments and applied policy details, as described above and in more detail below.

It should also be noted that the policy framework module 216 may form a portion of other circuitry described without departure from the scope of the present subject matter. Further, the policy framework module 216 may alternatively be implemented as an application stored within the memory 210. In such an implementation, the policy framework module 216 may include instructions executed by the CPU 202 for performing the functionality described herein. The CPU 202 may execute these instructions to provide the processing capabilities described above and in more detail below for the core processing module 200. The policy framework module 216 may form a portion of an interrupt service routine (ISR), a portion of an operating system, a portion of a browser application, or a portion of a separate application without departure from the scope of the present subject matter.

The policy registry 114 is also shown associated with the core processing module 200 within FIG. 2 to show that the policy registry 114 may be coupled to the core processing module 200 without requiring external connectivity, such as via the network 106 or the network 112.

The CPU 202, the display 204, the input device 206, the communication module 208, the memory 210, the policy framework module 216, and the policy registry 114 are interconnected via an interconnection 222. The interconnection 222 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor (s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the policy registry 114 is illustrated as a separate component for purposes of example, the information stored within the policy registry 114 may also/alternatively be stored within the memory 210 without departure from the scope of the present subject matter. Accordingly, the core processing module 200 may take many forms and may be associated with many platforms.

Figure 3:
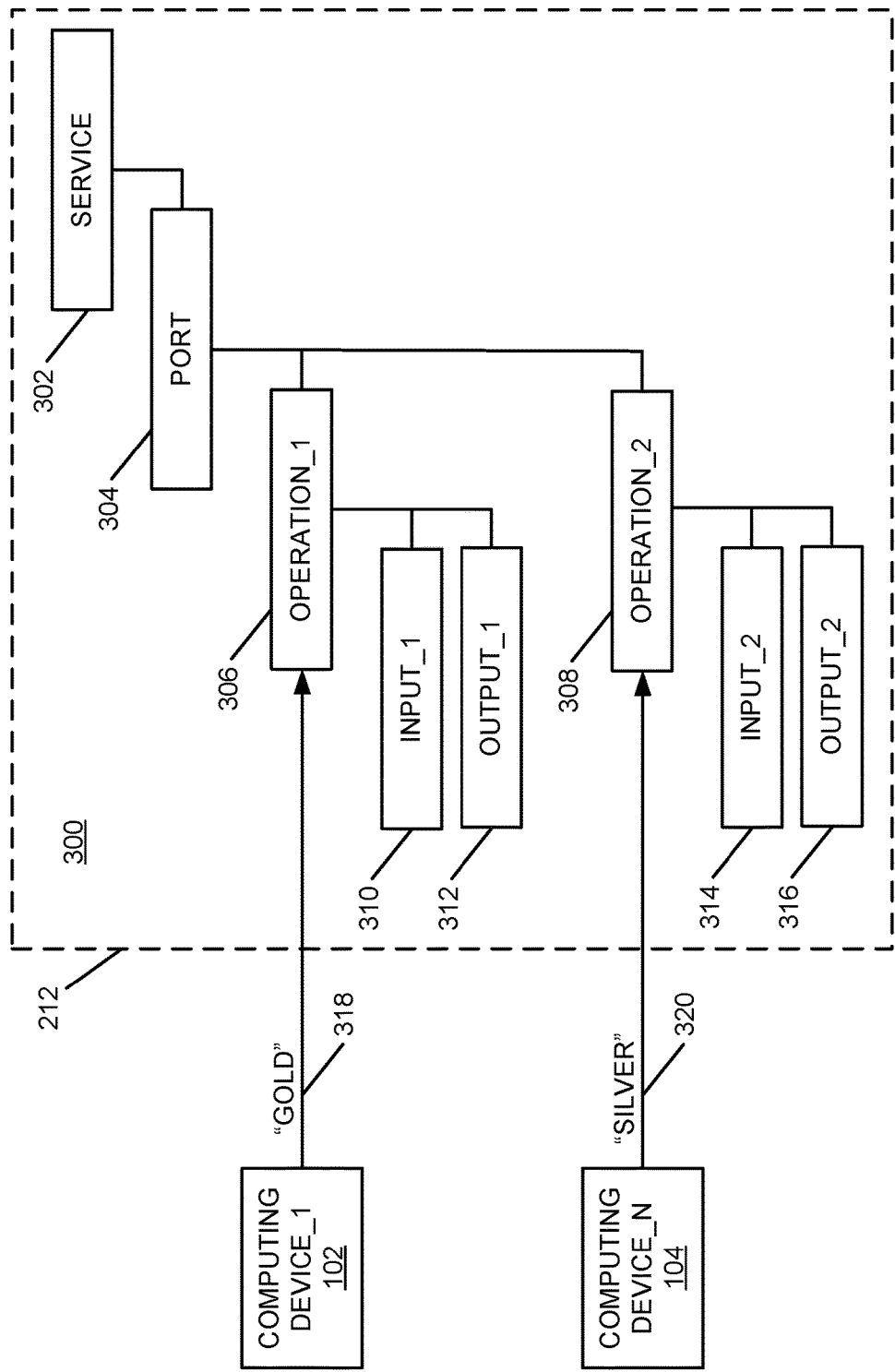
FIG. 3 is a diagram of an example of an implementation of a policy hierarchy that may be processed for visualization of runtime resource policy attachments and applied policy details according to an embodiment of the present subject matter.

FIG. 3 is a diagram of an example of a policy hierarchy 300 that may be processed for visualization of runtime resource policy attachments and applied policy details. It is understood that the policy hierarchy 300 may be implemented within the policy processing storage area 212, as represented by the dashed rectangular box. The policy hierarchy 300 includes several service resources, a parent hierarchical service resource named "service" 302, a "port" service resource 304, an "operation_1" service resource 306 and an "operation_2" service resource 308. The operation_1 service resource 306 includes an "input_1" service resource 310 and an "output_1" service resource 312. The operation_2 service resource 308 includes an "input_2" service resource 314 and an "output_2" service resource 316. Each of the service resources 302 through 316 may be analyzed as described above and in more detail below to provide visualization of runtime resource policy attachments and applied policy details. It is understood that any service resource within the policy hierarchy 300 that is lower in hierarchical level relative to any other service resource may inherit policy attachments from the other service resource. As such, while the present example policy hierarchy 300 includes only a few service resources, a policy hierarchy may have many more service resources and hierarchy levels. Accordingly, the present technology may be utilized to evaluate policy attachments and applied policy details within such a complex policy hierarchy during runtime.

For purposes of the present example, two computing devices, specifically the computing device_1 102 and the computing device_N 104, are illustrated. The computing device_1 102 is assumed to be a "gold" service level member, while the computing device_N 104 is assumed to be a "silver" service level member. It is additionally assumed that the gold service level member has contracted (e.g., via SLA) for at least one higher-level service offering (e.g., number of messages per unit time) relative to the silver service level member. When the gold service level member utilizing the computing device_1 102 initiates a message 318, it is received by the operation_1 service resource 306 and is processed according to the configured service policy attachments (e.g., processing rules and processing actions for the gold service level). Similarly, when the silver service level member utilizing the computing device_N 104 initiates a message 320, it is received by the operation_2 service resource 308 and is processed according to the configured service policy attachments (e.g., processing rules and processing actions for the silver service level). As such, depending upon the service level and where the respective policies are attached, transactions per minute, message latency, details about the specific customer (e.g., credentials, service level), the time of day, and other factors may be captured in the policy implementation.

Figure 4:
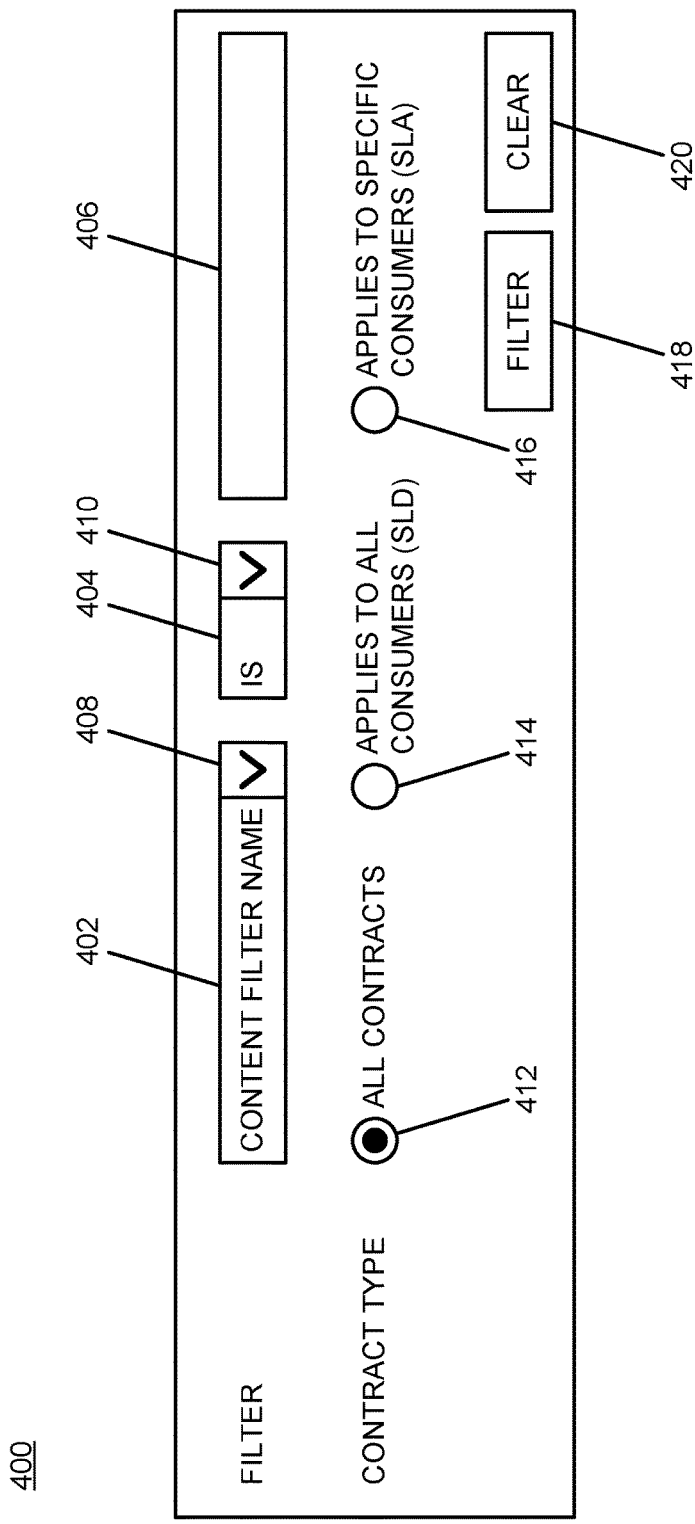
FIG. 4 is a diagram of an example of an implementation of a graphical user interface (GUI) for visualization of runtime resource policy attachments and applied policy details that allows selection of filter types according to an embodiment of the present subject matter.

FIG. 4 is a diagram of an example of an implementation of a graphical user interface (GUI) 400 for visualization of runtime resource policy attachments and applied policy details that allows selection of filter types. At the beginning of the visualization process, the user/administrator may be allowed to apply a set of filters to restrict what information is visualized in the following steps of the visualization. This filter selection allows the user to focus/specify what is visualized down to a particular set of information that is of interest to the user. In this implementation, the user may be allowed to filter based upon policy names, message content filters, or broad types of policies such as those applied to particular consumers (SLA) or those applied to all consumers (SLD).

As can be seen from FIG. 4, a first row of the GUI 400 is a "Filter" specification row, where the user may specific a filter specification 402 ("content filter name" within the present example), a matching criteria selection 404 ("is" within the present example), and enter a text name for the filter specification within the text-entry field 406. A drop-down arrow 408 allows the user to select additional/alternative filter specification types, such as for purposes of example "Content Filter Value" and "Policy Name." A drop-down arrow 410 allows the user to specify additional/alternative matching criteria, such as for purposes of example "is not" and "contains."

A second row of the GUI 400 is a "Contract Type" specification row. Several radio button selection options are presented. A first "All Contracts" selection radio button 412 allows the user to specify filtering for both SLAs and SLDs. A second "Applies to All Consumers (SLD)" selection radio button 414 allows the user to specify filtering for SLDs. A third "Applies to Specific Consumers (SLA)" selection radio selection button 416 allows the user to specify filtering for SLAs. A "Filter" button 418 allows the user to specify filtering based upon the configured/selected options. A "Clear" button 420 allows the user to clear the filtering selections. The choice of whether to implement filtering is up to the respective user, and the user may proceed to the first step of the visualization, as described further below with or without filtering the configuration.

FIG. 5 is a diagram of an example of an implementation of a graphical user interface (GUI) 500 for visualization of runtime resource policy attachments and applied policy details that allows visualization of a resource hierarchy 502, again optionally based upon filtering as described above. The resource hierarchy 502 includes a hierarchical expandable/collapsible representation of service resources and applied policy attachments. The plus symbols (e.g., "+") allow the user to expand the resource hierarchy 502 at a location of the plus symbols, and the minus symbols (e.g., "−") allow the user to collapse the resource hierarchy 502 at a location of the minus symbols. The uniform resource locators (URLs) within the resource hierarchy 502 are illustrated as local references for purposes of example, but may be URLs to Internet/Intranet accessible policies as appropriate for a given implementation.

The resource hierarchy 502 allows the user to understand what resources are present, and allows the user to understand the arrangement of those resources, such that the user may understand through visualization any policy inheritance which may be taking place with respect to the resources. Within the present set of examples, the service level (e.g., "SERVICE" level of the hierarchy) inherits policies from the WSDL level (e.g., web services description language "WSDL" level of the hierarchy), similarly to the description of FIG. 3 above for the "port" service resource 304 and "service" 302, respectively. Therefore, policies attached at WSDL and service levels will also apply at the port level.

Understanding the organization of the hierarchy allows the user to make efficient use of policies by adding, removing, or altering policies at the highest level within the resource hierarchy 502, often removing the need to attach identical policies at multiple levels. Without this hierarchical visualization presented within the resource hierarchy 502, the inheritance of policy attachments may be a source of confusion when a policy is unexpectedly inherited that results in unexpected system behavior. Based upon the present technology, the visualization may utilize a tree-based UI element such as the resource hierarchy 502 to represent the hierarchy, which may efficiently communicate the resource hierarchy and the actual policy inheritance to the user.

FIG. 6 is a diagram of an example of an implementation of a graphical user interface (GUI) 600 for visualization of runtime resource policy attachments and applied policy details for visualization of sets of content filters that may be evaluated to determine what policies that apply to a given message are processed by a resource, again optionally based upon filtering as described above. A content filter name column 602 lists content filters. A content filter value column 604 lists values associated with the respective content filters. A content filter name column 606 lists any additional content filters that may be additionally associated with one another. A content filter value column 608 lists values associated with the respective additional content filters. A view column 610 lists the number of policies that are attached. The user may "mouse over" the numeric icon to see details of the attached policies, such as the policy name and other details. If there are more content filters than fit in the grid, these may be enumerated within the view column 610. Mousing over the view column 610 may then additionally list the extra content filters. As such, the grid layout with mouse-over expansion of information allows a scaled representation of policy attachment within a convenient grid-style visualization.

It should be noted that several options exist for policy attachment representations. The present example identifies policy attachments that specify the same set of content filters and combines them together into a single "effective policy." For example, within a first row 612 of the GUI 600, it is assumed that one (1) policy attachment is specified within the column 610 that specifies that there are no conditions, and that the effective policy will be applied in any situation. As such, an "Any" row represents that there are no specific content filters specified, and that the effective policy will be applied in any situation. Within a second row 614 of the GUI 600, it is assumed there are three (3) policy attachments specified within the view column 610 that all specify that they applied to customers with a membership level of "gold." The present example illustrates a single row with a content filter name 602 of "Member Level" and a content filter value 604 of "Gold." The present example lists all three policy attachments within the first row as an effective policy. Similar analysis for details that are provided within FIG. 6 may be performed for each of a row 616 and a row 618, and are omitted herein for brevity.

As such, the effective policy row correlates all applied policy attachments. Detailed actions and runtime conditions that created this single effective policy may also be illustrated (e.g., by user selection of a row) to visualize for the user the complete set of actions that are taken in response to a gold level customer, rather than having those details spread across a number of locations. As such, the user may browse policy attachments, rather than having to seek out and determine policy inter-relationships. Accordingly, the visualization technology described herein provides the user with a visual depiction of what overall system behavior will be taken in response to given runtime operating conditions. Accordingly, the present technology allows the user to predict and take action on complex system behavior rather than having to search through multiple policy files to identify the effective action taken as a result of the many different policies.

Figure 7:
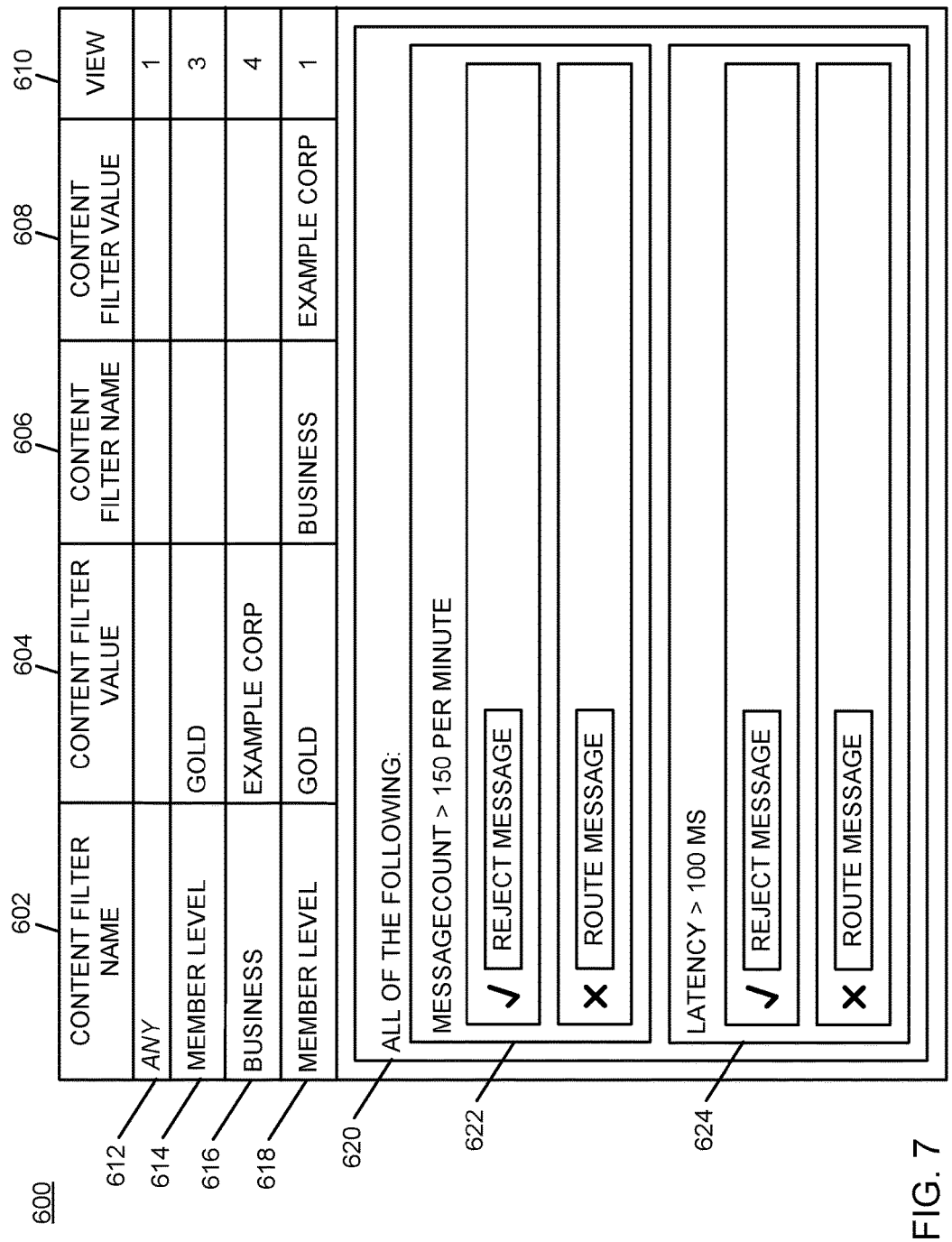
FIG. 7 is a diagram of an example of an implementation of the graphical user interface (GUI) described in association with FIG. 6 for visualization of runtime resource policy attachments and applied policy details where a user has selectively expanded an effective policy from the policy grid to view the policy attachments and applied policy details according to an embodiment of the present subject matter.

FIG. 7 is a diagram of an example of an implementation of the graphical user interface (GUI) 600 described above in association with FIG. 6 for visualization of runtime resource policy attachments and applied policy details where a user has selectively expanded an effective policy from the policy grid to view the policy attachments and applied policy details. The expanded GUI 600 provides visualization of any run-time conditions that are evaluated within the effective policy (the combined policy attachments) and the actions that are taken in response to each condition.

As can be seen in FIG. 7, the columns 602 through 610 described above are again illustrated. Within FIG. 7, it can be seen that the row 618 is illustrated as having been selectively expanded (e.g., via a mouse click) by the user.

Within an expansion area 620, an expansion of the row 618 shows that the effective policy implemented by the set of policy attachments includes two sets of conditions, all of which are evaluated (e.g., "All of the Following) for messages for which the respective policy attachments are to be enforced. A first policy attachment condition 622 checks message count (e.g., "Message Count>150 Per Minute," meaning a message count greater than one hundred and fifty per minute) and has an action of "Reject Message" if the condition evaluates to true (e.g., check mark) or an action of "Route Message" if the condition evaluates to false (e.g., "x" mark). The second policy attachment condition 624 checks latency (e.g., "Latency>100 ms," meaning a latency greater than one hundred milliseconds for a message) and also has an action of "Reject Message" if the condition evaluates to true or an action of "Route Message" if the condition evaluates to false.

It should be noted that many possibilities for a display format other than within rows are possible, such as columnar, or other arrangement, and all such possibilities are considered within the scope of the present subject matter. Additionally, many possibilities for conditions exist, such as a time of day condition, a day of the week condition, a network latency condition, a number of transactions condition, and other conditions. The actions may be to reject a message, to log the message, to route the message to another backend URL, or other actions. Additionally, in the case of a security policy, an action may be to expect or not expect a particular security token. Any such possible conditions and actions are considered to be within the scope of the present technology. A policy specification may allow for nested conditions, such as "Any of the Following" (as shown in FIG. 7), "Exactly One of the Following," each of which may be represented within the visualization (as shown within FIG. 7) and may be used to identify the actions that are taken if the runtime condition is evaluated to true or false.

The previous stages of the visualization allow the user to understand which policies are included at each level of the resource hierarchy and under what message circumstances the respective policy attachments are included for evaluation. This stage is concerned with laying out the detail of the policy attachments to specify which actions the compressed/consolidated policy attachments (e.g., effective policies) define and under what runtime conditions the policy attachments are triggered.

Separate policies have been combined in the previous visualization stages into a single effective policy. At this level, the detail for multiple policy attachments may be shown to the user simultaneously. This part of the policy visualization allows the user to have a clear visualization of all of the conditions and actions that are applied to a given message without being required to read and interpret all of the separate policy attachments. As such, the present technology may help with troubleshooting and altering system behavior in an efficient and comprehensive manner.

Figure 8:
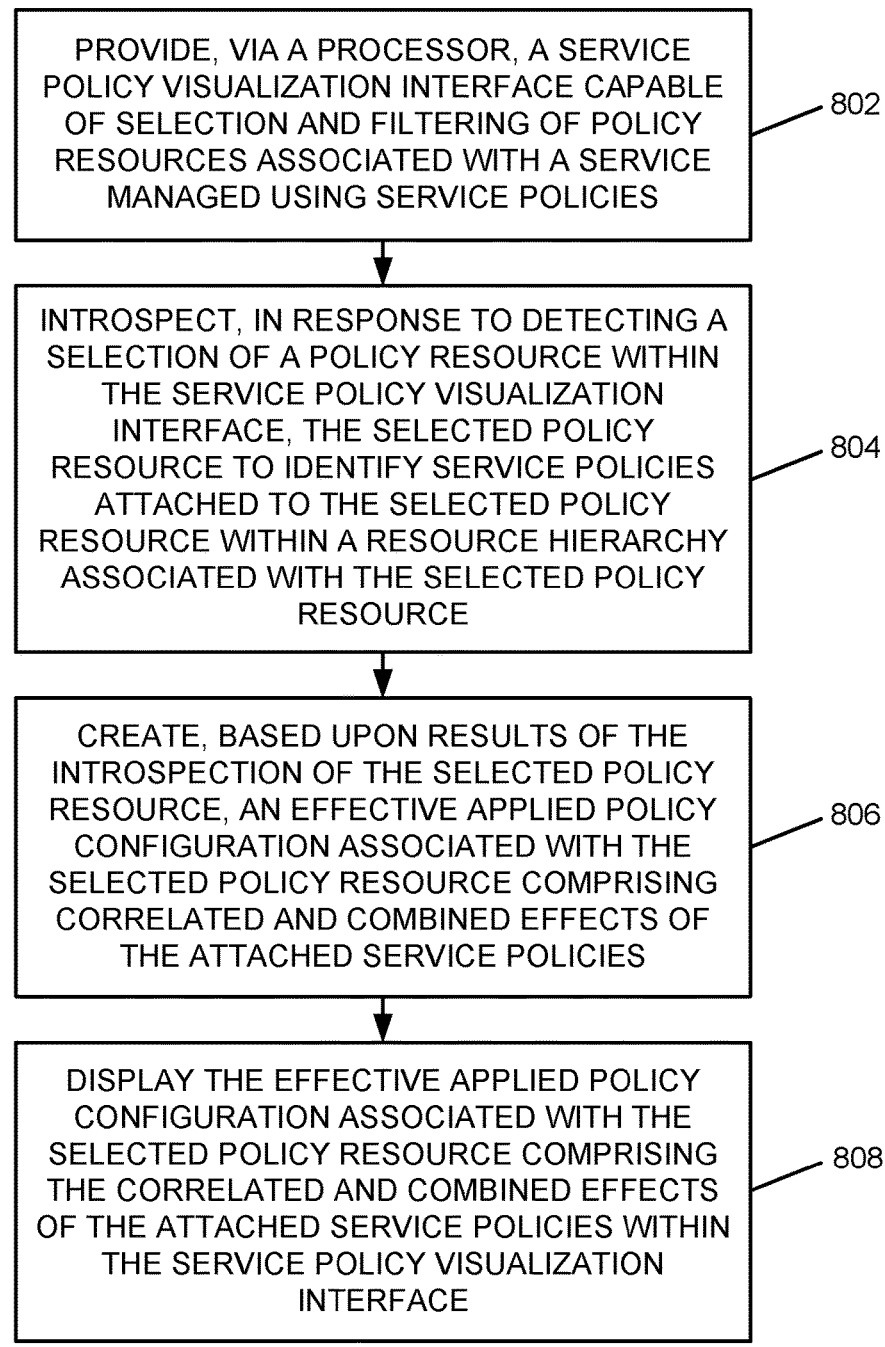
FIG. 8 is a flow chart of an example of an implementation of a process for visualization of runtime resource policy attachments and applied policy details according to an embodiment of the present subject matter.
Figure 9:
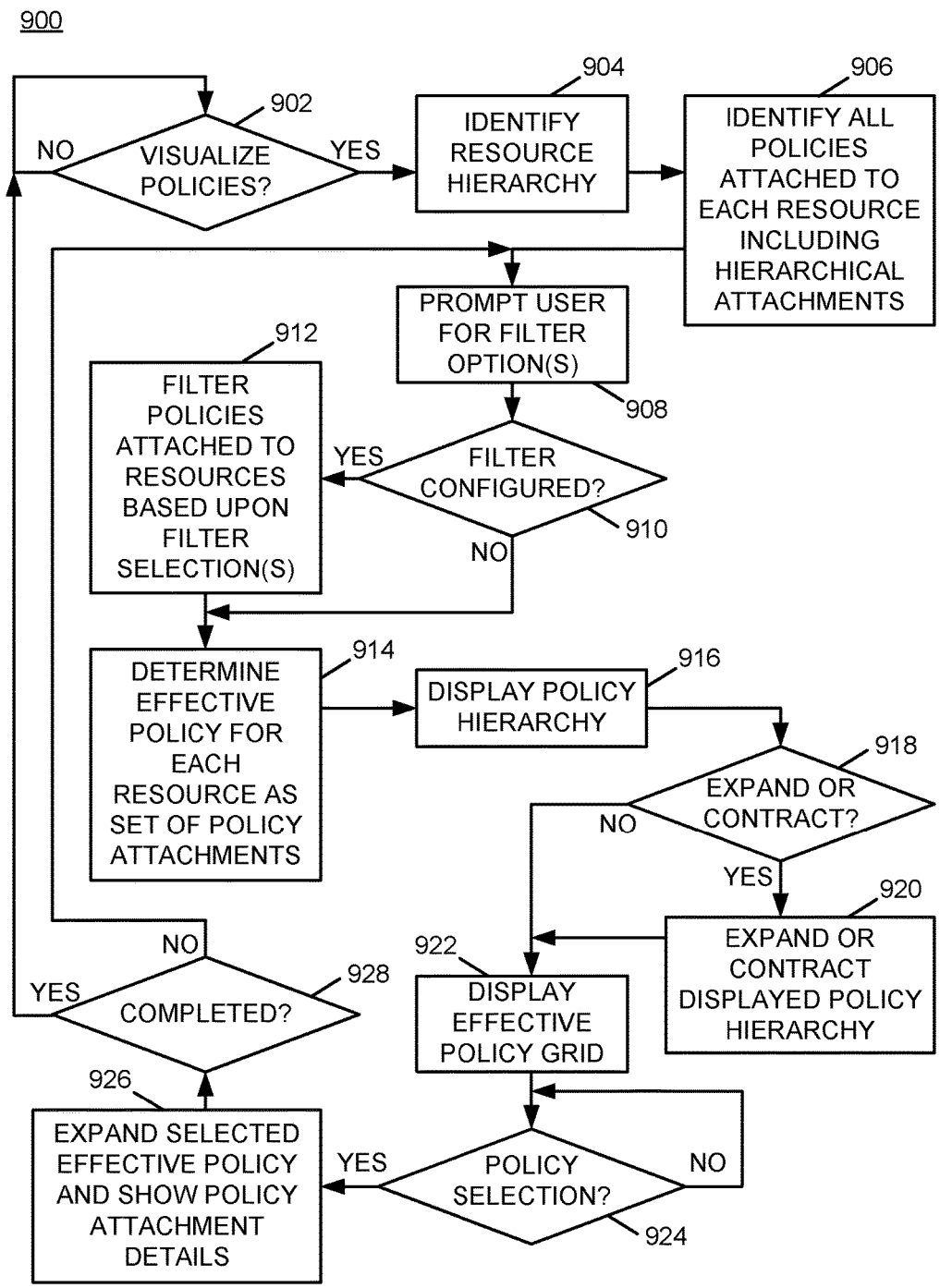
FIG. 9 is a flow chart of an example of an implementation of a process for visualization of runtime resource policy attachments and applied policy details according to an embodiment of the present subject matter.

FIG. 8 through FIG. 9 described below represent example processes that may be executed by devices, such as the core processing module 200, to perform the visualization of runtime resource policy attachments and applied policy details associated with the present subject matter. Many other variations on the example processes are possible and all are considered within the scope of the present subject matter. The example processes may be performed by modules, such as the policy framework module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 8 is a flow chart of an example of an implementation of a process 800 for visualization of runtime resource policy attachments and applied policy details. At block 802, the process 800 provides, via a processor, a service policy visualization interface that provides selection and filtering of policy resources associated with a service managed using service policies. At block 804, the process 800 introspects, in response to detecting a selection of a policy resource within the service policy visualization interface, the selected policy resource to identify service policies attached to the selected policy resource within a resource hierarchy associated with the selected policy resource. At block 806, the process 800 creates, based upon results of the introspection of the selected policy resource, an effective applied policy configuration associated with the selected policy resource comprising correlated and combined effects of the attached service policies. At block 808, the process 800 displays the effective applied policy configuration associated with the selected policy resource comprising the correlated and combined effects of the attached service policies within the service policy visualization interface.

FIG. 9 is a flow chart of an example of an implementation of a process 900 for visualization of runtime resource policy attachments and applied policy details. The process 900 may be performed, for example, by the policy visualization module 220. The process 900 may be implemented in association with a service policy visualization interface, such as described above in association with FIG. 4 through FIG. 7, that provides selection and filtering of policy resources associated with a service that is enforced using service policies via a policy enforcement point (PEP). The attached service policies may, for example, be mediation policies, routing policies, security policies, custom-defined resource processing policies, or other polices as appropriate for the given implementation.

At decision point 902, the process 900 makes a determination as to whether a request to perform policy visualization has been detected, such as via a user interface request from a user to invoke the visualization of runtime resource policy attachments and applied policy details described herein. In response to determining that a request to perform policy visualization has been detected, the process 900 identifies a resource hierarchy, such as the policy hierarchy 300 described above, associated with a policy implemented within a runtime system, such as the system 100, at block 904.

At block 906, the process 900 identifies all policies attached to each resource including hierarchical policy attachments (e.g., inherited policy attachments). Identification of policy attachments may include introspecting, in response to detecting a selection of a policy resource within a service policy visualization interface, the selected policy resource to identify service policies attached to the policy resource within a resource hierarchy associated with the policy resource. The selected policy resource may include a service-level resource, a port resource, an operation resource associated with the service, or other resource as appropriate for a given implementation. The service may include, for example, one of a web service, a representational state transfer (REST), a web application, or other service as appropriate for a given implementation. Identification of the service policies attached to the policy resource within a resource hierarchy associated with the policy resource may further include determining conditions under which the attached service policies are configured to be applied to the selected policy resource. Identification of the service policies attached to the policy resource within a resource hierarchy associated with the policy resource may additionally include determining runtime conditions configured within the attached service policies and conditional actions configured in association with the configured runtime conditions to be performed in response to the selected policy resource.

At block 908, the process 900 prompts the user for entry of filter options, such as the content filter options and other filtering options described, for example, above in association with FIG. 4. As described above, filter configuration may be considered optional. As such, at decision point 910, the process 900 makes a determination as to whether a filter has been configured by the user. In response to determining that a filter has been configured by the user, the process 900 filters the policies attached to the resources based upon the filter selection(s) at block 912. As such, the process 900 may detect a selection of at least one message content filter that describes a specific policy enforcement scenario associated with the selected policy resource, and may apply the selected message content filter to the selected policy resource.

In response to filtering the policies attached to the resources based upon the filter selection(s) at block 912, or in response to making a determination at decision point 910 that a filter has not been configured by the user, the process 900 determines an effective policy for each resource as a set of policy attachments at block 914. As described above, the effective policy may include policies defined within all layers of hierarchy within the resource hierarchy and identifies all conditions upon which actions may be taken upon messages by a given resource. Further, determining the effective policy may include correlating combined effects of the attached service policies based upon results of the introspection of the selected policy resource into an effective applied policy configuration associated with the policy resource. The attached service policies may include multiple service policies applied from multiple different hierarchical policy attachment levels associated with the selected policy resource.

At block 916, the process 900 displays the policy hierarchy, such as described, for example, above in association with FIG. 5. At decision point 918, the process 900 makes a determination as to whether to expand or contract the displayed policy hierarchy, such as in response to user selections of plus or minus icons associated with a policy hierarchy, as also described above. In response to determining to expand or contract the displayed policy hierarchy, the process 900 expands or contracts the displayed policy hierarchy at block 920. It should be noted that the processing may be iterative without departure from the scope of the present technology to repeatedly respond to expansion or contraction requests associated with the displayed policy hierarchy.

In response to completion of the expanding and/or contracting of the displayed policy hierarchy at block 920, or in response to determining at decision point 918 that a request to expand or contract the displayed policy hierarchy has not been detected, the process 900 displays the effective policy grid at block 922, such as described, for example, above in association with FIG. 6. Displaying the effective policy may include displaying the effective applied policy configuration associated with the policy resource including the correlated effects of the attached service policies within the service policy visualization interface. Displaying the effective policy may include displaying, based upon one or more applied message content filters, a resultant set of runtime conditions configured within the attached service policies and conditional actions configured in association with the configured runtime conditions to be performed in response to messages processed by the selected policy resource.

At decision point 924, the process 900 makes a determination as to whether an effective policy selection has been detected, such as, for example, a selection of a row (e.g., a mouse click) within an effective policy grid that contains a displayed representation of an effective policy. In response to determining that an effective policy selection has been detected, the process 900 expands the selected effective policy and shows the policy attachment details (e.g., local and hierarchically inherited) at block 926, such as described, for example, above in association with FIG. 7. The policy attachment details specify what runtime conditions, if any, are evaluated by a selected resource, and specify what actions, if any, are performed for a particular set of content filters. As such, the process 900 expands, in response to a user selection of a displayed effective policy row of the effective applied policy configuration associated with the policy resource, the selected displayed effective policy row to display the resulting set of runtime conditions configured within the attached service policies and conditional actions configured in association with the configured runtime conditions to be performed in response to messages processed by the selected policy resource. Again, it should be noted that the processing may be iterative without departure from the scope of the present technology to repeatedly respond to effective policy selections and to repeatedly show policy attachment details.

At decision point 928, the process 900 makes a determination as to whether processing is completed, such as by detection of a user request to terminate a policy analysis session. In response to determining that processing has not been completed, the process 900 returns to block 908 and iterates as described above. In response to determining that processing has been completed, the process 900 returns to decision point 902 and iterates as described above.

As such, the process 900 provides technology to operate with three interrelated aspects of a policy and presents these interrelated aspects to the user (e.g., policy administrator) in three steps, each of which also provides visualized output to assist the user with interpretation of policy applications within a runtime system. The first step identifies what policies are attached and inherited at each resource. The second step determines what effective policies are created from the various disparate policy attachment files and message content filters. The third step determines what runtime conditions, if any, are evaluated, and what actions, if any, are performed for a particular set of content filters. It is the combination of these three aspects of the visualization that together allow the user to fully visualize the complete policy applied to messages for a given web service, and to accurately understand and predict system behavior for any given set of resources, messages, and runtime conditions.

As described above in association with FIG. 1 through FIG. 9, the example systems and processes provide visualization of runtime resource policy attachments and applied policy details. Many other variations and additional activities associated with visualization of runtime resource policy attachments and applied policy details are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
   a display; and
   a processor programmed to:
      create, responsive to a selection of a policy resource within a service policy visualization interface based upon results of programmatic introspection of the selected policy resource, an effective applied policy configuration associated with the selected policy resource comprising correlated and combined effects of service policies identified by the programmatic introspection as attached to the selected policy resource within a resource hierarchy associated with the selected policy resource; and
      display, via the display, the effective applied policy configuration associated with the selected policy resource comprising the correlated and combined effects of the attached service policies within the service policy visualization interface.

2. The system of claim 1, where the attached service policies comprise a plurality of service policies applied from a plurality of different hierarchical policy attachment levels of a policy hierarchy within the resource hierarchy associated with the selected policy resource.

3. The system of claim 1, where the programmatic introspection of the selected policy resource comprises the processor being programmed to:
   determine conditions under which the attached service policies are configured to be applied to the selected policy resource; and
   determine runtime conditions configured within the attached service policies and conditional actions configured in association with the configured runtime conditions to be performed in response to the selected policy resource.

4. The system of claim 1, where the processor is further programmed to:
   detect a selection of at least one message content filter that describes a specific policy enforcement scenario associated with the selected policy resource;
   apply the selected at least one message content filter to the selected policy resource; and display, based upon the applied at least one message content filter, a resultant set of runtime conditions configured within the attached service policies and conditional actions configured in association with the configured runtime conditions to be performed in response to messages processed by the selected policy resource, the processor being programmed to:
expand, in response to a user selection of a displayed effective policy row of the effective applied policy configuration associated with the selected policy resource, the selected displayed effective policy row to display the resultant set of runtime conditions configured within the attached service policies and the conditional actions configured in association with the configured runtime conditions to be performed in response to messages processed by the selected policy resource.

5. The system of claim 1, where:
the selected policy resource is associated with a service managed using service policies;
the service comprises one of a web service, a representational state transfer (REST), and a web application; and
the attached service policies comprise service policies selected from a group consisting of mediation policies, routing policies, security policies, and custom-defined resource processing policies.

6. The system of claim 1, where the selected policy resource comprises a resource selected from a group consisting of a service-level resource, a port resource, and an operation resource associated with the service.

7. A computer program product, comprising:
a computer readable storage medium having computer readable program code embodied therewith, where the computer readable program code when executed on a computer causes the computer to:
create, responsive to a selection of a policy resource within a service policy visualization interface based upon results of programmatic introspection of the selected policy resource, an effective applied policy configuration associated with the selected policy resource comprising correlated and combined effects of service policies identified by the programmatic introspection as attached to the selected policy resource within a resource hierarchy associated with the selected policy resource; and
display the effective applied policy configuration associated with the selected policy resource comprising the correlated and combined effects of the attached service policies within the service policy visualization interface.

8. The computer program product of claim 7, where the attached service policies comprise a plurality of service policies applied from a plurality of different hierarchical policy attachment levels of a policy hierarchy within the resource hierarchy associated with the selected policy resource.

9. The computer program product of claim 7, where, in causing the programmatic introspection of the selected policy resource, the computer readable program code when executed on the computer further causes the computer to:
determine conditions under which the attached service policies are configured to be applied to the selected policy resource; and
determine runtime conditions configured within the attached service policies and conditional actions configured in association with the configured runtime conditions to be performed in response to the selected policy resource.

10. The computer program product of claim 7, where the computer readable program code when executed on the computer further causes the computer to:
detect a selection of at least one message content filter that describes a specific policy enforcement scenario associated with the selected policy resource;
apply the selected at least one message content filter to the selected policy resource; and
display, based upon the applied at least one message content filter, a resultant set of runtime conditions configured within the attached service policies and conditional actions configured in association with the configured runtime conditions to be performed in response to messages processed by the selected policy resource.

11. The computer program product of claim 10, where in causing the computer to display, based upon the applied at least one message content filter, the resultant set of runtime conditions configured within the attached service policies and the conditional actions configured in association with the configured runtime conditions to be performed in response to messages processed by the selected policy resource, the computer readable program code when executed on the computer causes the computer to:
expand, in response to a user selection of a displayed effective policy row of the effective applied policy configuration associated with the selected policy resource, the selected displayed effective policy row to display the resultant set of runtime conditions configured within the attached service policies and the conditional actions configured in association with the configured runtime conditions to be performed in response to messages processed by the selected policy resource.

12. The computer program product of claim 7, where:
the selected policy resource is associated with a service managed using service policies;
the service comprises one of a web service, a representational state transfer (REST), and a web application; and
the attached service policies comprise service policies selected from a group consisting of mediation policies, routing policies, security policies, and custom-defined resource processing policies.

13. The computer program product of claim 7, where the selected policy resource comprises a resource selected from a group consisting of a service-level resource, a port resource, and an operation resource associated with the service.

* * * * *